(12) United States Patent
Kim

(10) Patent No.: US 11,520,155 B2
(45) Date of Patent: Dec. 6, 2022

(54) OPTICAL DEVICE

(71) Applicant: PRAZEN.CO., LTD., Gyeonggi-do (KR)

(72) Inventor: Heekyung Kim, Gyeonggi-do (KR)

(73) Assignee: PRAZEN.CO., LTD., Gyeonggi-do (KR)

( * ) Notice: Subject to any disclaimer, the term of this patent is extended or adjusted under 35 U.S.C. 154(b) by 231 days.

(21) Appl. No.: 16/782,910

(22) Filed: Feb. 5, 2020

(65) Prior Publication Data

US 2021/0033876 A1 Feb. 4, 2021

(30) Foreign Application Priority Data

Aug. 3, 2019 (KR) .................... 10-2019-0094622

(51) Int. Cl.
*G02B 27/14* (2006.01)
*G02B 27/10* (2006.01)

(52) U.S. Cl.
CPC ........... *G02B 27/106* (2013.01); *G02B 27/14* (2013.01)

(58) Field of Classification Search
CPC .............................. G02B 27/106; G02B 27/14
USPC ........................................ 359/629, 638–640
See application file for complete search history.

(56) References Cited

FOREIGN PATENT DOCUMENTS

JP 2013196348 A * 9/2013

* cited by examiner

*Primary Examiner* — William Choi
(74) *Attorney, Agent, or Firm* — IP & T Group LLP

(57) ABSTRACT

The present disclosure relates to an optical device of a projector. More specifically, the present disclosure relates to an optical device including a beam splitter which reflects a light beam of a display panel unit and transmits a light beam sensing an image of the screen, or transmits a light beam of the display panel unit and reflects a light beam sensing the image of the screen.

8 Claims, 6 Drawing Sheets

OPTICAL DEVICE

CROSS REFERENCE TO RELATED APPLICATION

The present application claims priority of Korean patent application number 10-2019-0094622 filed on Aug. 3, 2019, which is incorporated herein by reference in its entirety.

FIELD OF THE INVENTION

The present disclosure relates to an optical device. More specifically, the present disclosure relates to an optical device including a beam splitter which reflects a light beam of a display panel unit and transmits a light beam sensing an image of the screen, or transmits a light beam of the display panel unit and reflects a light beam sensing the image of the screen.

BACKGROUND OF THE INVENTION

Optical lens modules are widely used in general projectors, scanners, AR glasses, ultra short throw projectors, and head mounted devices.

For example, a beam projector is a device that projects and displays an image on a screen that is a certain distance away from itself. The beam projector may include a light source for generating a light beam constituting an image, a panel for providing image information to the light beam generated by the light source, and a lens unit including one or more lenses for projecting the image information into space.

Although the above-described panel imparts an image to the light beam generated from the light source, when viewing from the viewpoint of imaging optics, the image generated from the panel is enlarged and projected onto the screen, so that it is considered that the light beam is emitted from the panel.

In the case of a general beam projector, a long projection distance is required to form a large-sized image on a large screen, and there are problems such as an image being obscured when a person passes by a large space formed by the projection distance between the beam projector and the screen. Accordingly, a demand for an ultra-short throw projector is increasing, which is capable of projecting a large image even near the screen by having a large field of view.

In addition, an infrared camera is installed outside the ultra short throw projector to provide a touch function to the image projected from the ultra short throw projector. However, the ultra short throw projector is often used as a portable, so that when an infrared camera or the like is installed outside the ultra short throw projector, there is a problem in that the volume becomes large.

While a research on small and light weight has been conducted in AR glasses and head mounted devices, a separate device for recognizing external light is required.

In the case of using a beam projector or an ultra short throw projector that project images on the screen, there is also a problem in that it is difficult to determine the touched position of the projection due to an obstacle, for example, a human motion or an object, in the path between the infrared camera and the projection, thereby requiring an improvement in this point.

SUMMARY OF THE INVENTION

It is an object of the present disclosure to solve the problems of the prior art as described above and the technical problems requested from the past.

It is another object of the present disclosure to provide an optical device having a sensor unit therein for detecting whether a touch has been made. Specifically, it is the object of the present disclosure to provide an optical device having a beam splitter that reflects a light beam of the display panel unit and transmits a light beam sensing an image of the screen, or that transmits a light beam of the display panel unit and reflects the light beam sensing the image of the screen.

According to the present disclosure, there is provided an optical device, including a display panel unit configured to emit image light; a lens array configured to be disposed on an optical path between the display panel unit and a screen on which an image is implemented to refract, diffract and reflect the incident image light thereby forming the image on the screen, or transfer the light reflected from the screen to the display panel unit through the optical path; and a beam splitter configured to be disposed on the optical path between the display panel unit and the screen on which the image is implemented.

Preferably, the optical device may further include a light source for irradiating light beam to the screen.

Preferably, the optical device may further include a sensor unit disposed on the optical path of the splitter to detect the image reflected from the screen.

Preferably, the beam splitter may reflect the light beam of the display panel unit and transmit the light beam sensing the image of the screen, or the beam splitter may transmit the light beam from the display panel unit and reflect the light beam sensing the image of the screen.

Preferably, the beam splitter may be located between the display panel unit and the lens array, or between the lens array and the screen.

Preferably, the beam splitter may be one of a cube shape, a triangle shape and a plate shape.

Preferably, the optical device may be used in any one of ultra short throw projectors, short throw projectors, beam projectors, optical scanning devices, augmented reality glasses and head mounted devices.

According to the present disclosure, there is provided an optical device comprising an optical module that performs a combination of a projection function that implements an image by projecting a light beam from the micro-display panel to the screen and a sensing function that senses an external light beam and transfers it to a condensing sensor.

Effects

As described above, according to an optical device of the present disclosure, by installing a sensor unit on the optical device, the volume of a projection device can be reduced compared to installing the sensor unit outside the projector.

In addition, when the sensor unit is installed outside the projector and a certain object is placed in the path between the sensor unit and the projected image, a touch portion cannot be accurately identified. However, the sensor unit is installed in the optical device, thereby preventing difficulties caused by external light path interferences to occur.

DETAILED DESCRIPTION OF THE EMBODIMENTS

Hereinafter, the most preferred embodiments of the present disclosure will be described in detail with reference to the accompanying drawings, so that those skilled in the art can easily implement the technical ideas of the present disclosure. In addition, in describing the present disclosure, when it is determined that detailed descriptions of related well-known structures or functions may obscure the subject matter of the present disclosure, detailed descriptions thereof will be omitted.

Figure 1A:
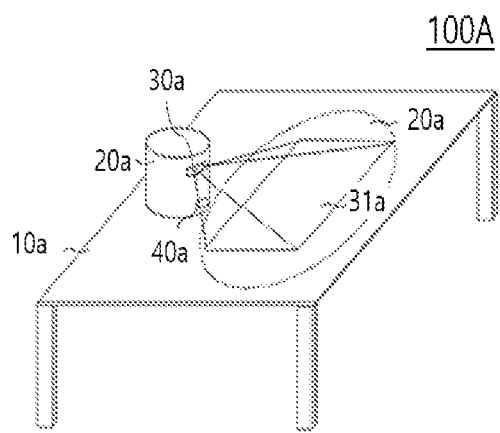
FIG. 1A shows a schematic view of the ultra short throw projector according to the present disclosure.
Figure 1B:
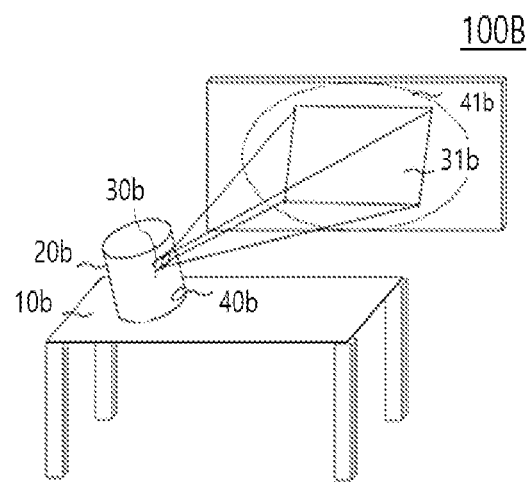
FIG. 1B shows a schematic view of an ultra short throw projector that projects a light beam on a screen plate according to the present disclosure.
Figure 1C:
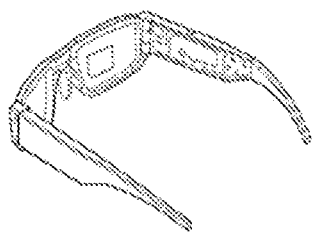
FIG. 1C shows a schematic view of an AR glasses according to the present disclosure.

FIG. 1A shows a schematic view of the ultra short throw projector according to the present disclosure and FIG. 1B shows a schematic view of an ultra short throw projector that projects a light beam on a screen plate according to the present disclosure.

That is, as shown in FIG. 1A, the ultra short throw projector of the present disclosure is placed on the table 10a to project an image onto the projection area 31a. Here, the light emitting portion 30a for emitting a light beam is provided on a side upper portion of the ultra short throw projector 20a, and a lamp 40a is provided on a side lower portion of the ultra short throw projector 20a. The area 41a in which the light beam emitted from the lamp 40a shines is wider than the projection area 31a projected by the ultra short throw projector 20a.

On the other hand, when the projection area 31a projected by the ultra short throw projector 20a is touched in the area 41a shone from the lamp 40a, the difference in the amount of light beam detected and the touch position can be measured through the sensor unit.

Meanwhile, as shown in FIG. 1B, the beam projector 20b may be placed on the table 10b to project the image on the projection area 31b of the screen. Here, the beam projector 20b is provided with a light emitting unit 30b that emits the light beam on the side upper portion, and a lamp 40b is provided on the side lower portion of the beam projector 20b. The light beam-emitting area 41b emitted from the lamp 40b is wider than the projection area 31b on the screen projected by the beam projector 20b.

On the other hand, when the projection area 31b on the screen projected by the beam projector 20b is touched in the area 41b projected from the lamp 40b, the difference in the amount of the light beam and the touch position can be measured through the sensor unit.

FIG. 10 shows an augmented glasses, and light beams of the projector are shone through legs and humans identify images projected on the lens of the glasses.

Figure 1D:
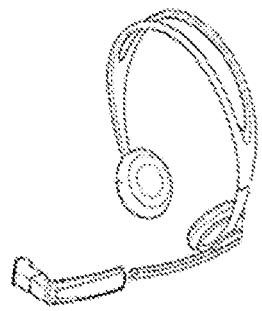
FIG. 1D shows a schematic view of a head mounted device according to the present disclosure.

FIG. 1D shows a head mounted device, which includes an image output unit for outputting a transmitted image signal, a head unit to mount on a user's head, at least one speaker mounted at an end of the head unit to reproduce an audio signal, a first connector having one end capable of rotating with one side of the speaker and a second connector having one end coupled with the image output and the other end coupled with the first connector in a ball-jointed manner. According to the head mounted display configured as described above, it is possible to provide an effect of variously adjusting the position of the image output according to the user's gaze and eyesight.

In the above-mentioned ultra short throw projectors, beam projectors, AR glasses and head mounted devices, a sensor unit may be used as a CMOS-mounted camera, for example.

In the following, using the optical device mounted inside any one of an ultra short throw projector, a short throw projector, a beam projector, an optical scanning device, augmented reality function glasses, and a head mounted device, a principle of identifying positions of touched portions in the projection areas 31a and 31b will be described in detail.

In the present disclosure, the optical device includes an optical module for performing a projection function that implements an image by projecting the light beam from a micro-display panel to a screen. However, the optical module does not perform a sensing function in which it senses external light and transfers it to a condensing sensor of a CMOS. Rather, the optical module includes a beam splitter that performs both a projection function and a sensing function in a single optical module.

The optical device includes, but is not limited to, an ultra short throw projector, a short throw projector, a beam projector, an optical scanning device, augmented reality glasses, and a head mounted device.

An optical device according to an embodiment of the present disclosure includes a display panel unit configured to emit image light; a lens array configured to be disposed on an optical path between the display panel unit and a screen on which an image is implemented to refract, diffract and reflect the incident image light thereby forming the image on the screen, or transfer the light reflected from the screen to the display panel unit through the optical path; and a beam splitter configured to be disposed on the optical path between the display panel unit and the screen on which the image is implemented.

Here, the beam splitter reflects the light beam of the display panel and transmits the light beam sensing the image of the screen.

In addition, the lens array is disposed on the optical path between the display panel and the screen on which the image is implemented to refract, diffract and reflect the incident image light so as to form an image on the screen. And the lens array transfers the light reflected from the screen to the display panel through the optical path.

An example of the above-described optical device will be described with reference to FIG. 2. When the light beam 36 is emitted from the display panel unit 32, the light beam 36 is reflected by the beam splitter 35 through the refracting part 33 having a plurality of lenses.

The display panel unit 32 may be used as a digital micromirror display (DMD), LCD, or LCOS, but is not limited thereto.

The refracting part 33 may include a prism, a first lens group consisted of a plurality of lenses, an aperture, a second lens group consisted of a plurality of lenses, and the like.

Here, the plurality of lenses may be used in combination of convex lenses, concave lenses, spherical lenses, aspheric lenses, and the like.

The light beam 36 passing through the beam splitter 35 is reflected by a reflector (not shown) if necessary to project an image on the table.

Figure 2:
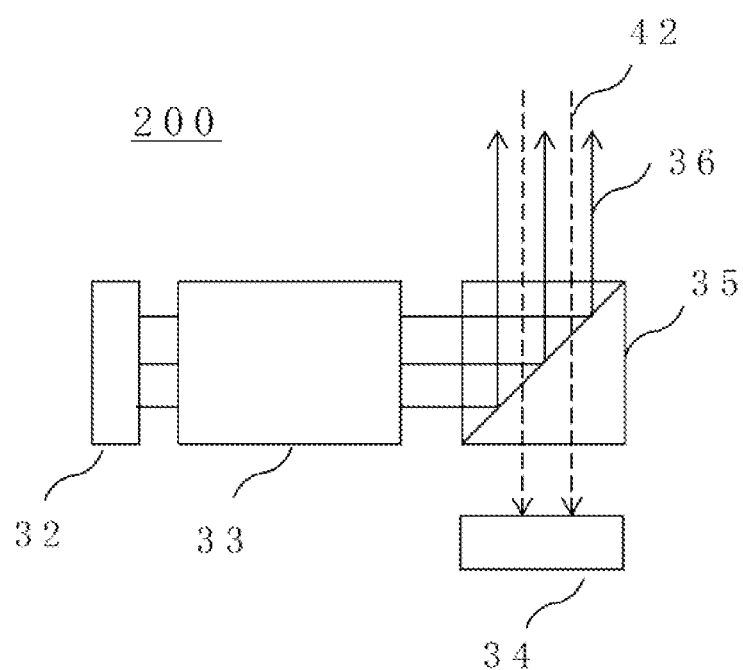
FIG. 2 shows an internal sectional view of an optical device of the present disclosure.

In FIG. 2, the refracting part 33 having a plurality of lenses is located between the panel part 32 and the beam splitter 35, but the light beam transmitted from the panel part may pass through the beam splitter to the refracting part having a plurality of lenses.

In order to give a touch function to the projected image, the light beam is irradiated to a larger area than the projected image. The light beam can be irradiated with an infrared ray, an ultraviolet ray, or a visible ray, and these rays can be combined and irradiated. And these rays are sensed by the sensor unit. The sensor unit detects the light beam reflected from the image reflected on the screen without using an external light source.

Hereinafter, an infrared light source will be described as an example, but is not limited thereto.

When a touch is made with a finger or the like, the amount of infrared ray of the portion touched on the projected image is different from that of infrared ray of the portion not touched. The infrared ray 42 reflected from the projected image is transmitted through the beam splitter 35 provided inside the optical device 200 so that the sensor unit 34 detects the difference in the amount of light and the touched position.

Figure 3A:
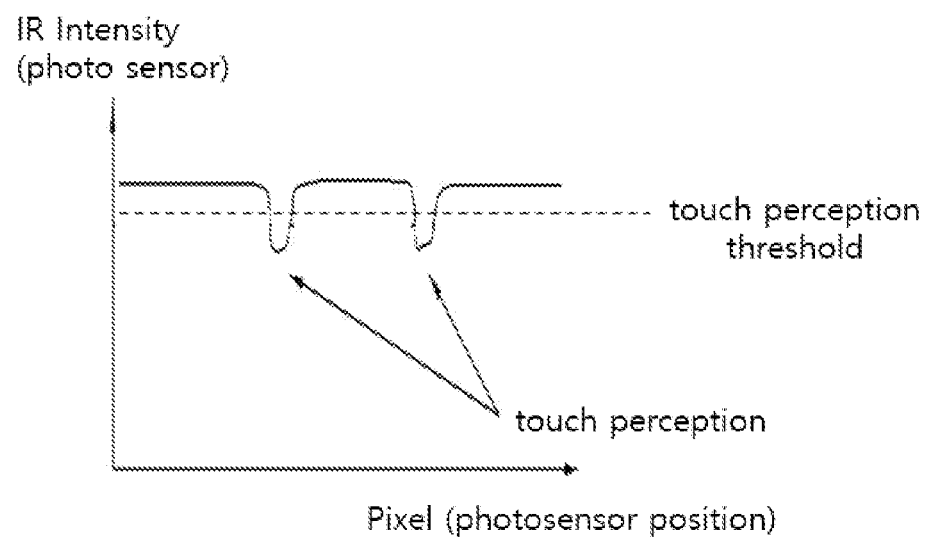
FIGS. 3A and 3B graphs showing a difference in infrared light amount for grasping a touch position according to the present disclosure.

The principle of measuring the difference of the amount of infrared ray of the portion touched by the sensor unit and its position will be described with reference to FIG. 3A. As shown in FIG. 3A, when a specific position in the projected image is touched, the amount of infrared ray reflected from the touched portion is reduced, and the sensor senses whether or not any pixel is touched below the preset lower threshold value and its position.

Figure 3B:
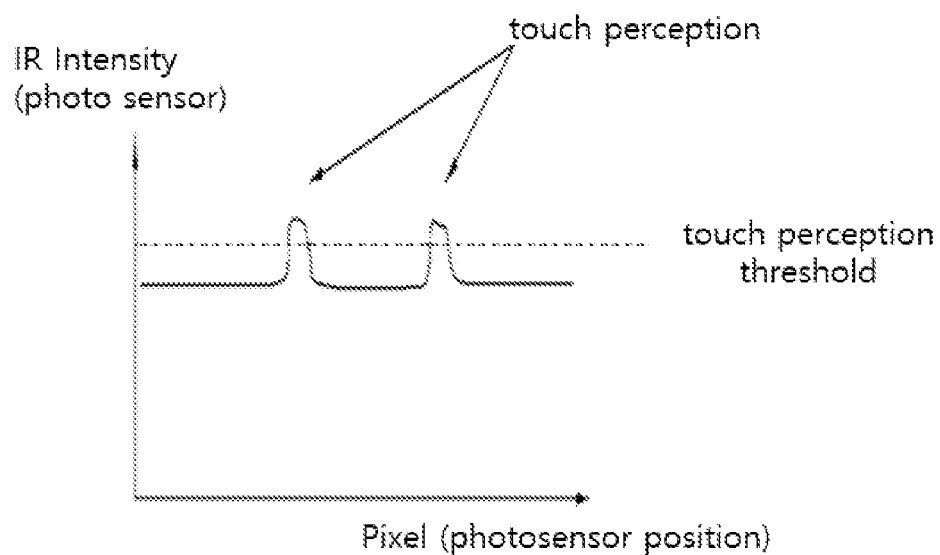

Meanwhile, as shown in FIG. 3B, when a specific position in the projected image is touched, an upper threshold value higher than the amount of the infrared ray irradiated to the image may be set in order to sense a touch by a metal, a nail, or a highly reflective material.

Here, preferably, the upper threshold value may be set to 130% of the amount of the infrared ray irradiated to the projected image or more, and the lower threshold value may be set to 70% of the amount of the infrared ray irradiated to the image or less. And, more preferably, the upper threshold value may be set to 110% of the infrared ray irradiated to the image or more, and the lower threshold value may be set to 90% of the amount of the infrared ray irradiated to the image or less. But the above-mentioned threshold values are not limited thereto. That is, in consideration of the resolution and sensitivity of the sensor unit to be used, the upper and lower threshold values for the amount of the infrared ray may be raised or lowered.

Next, the beam splitter 35 may reflect the light beam of the display panel unit and transmit the image on the screen, which is described with reference to FIG. 4 as an example. Hereinafter, while an infrared ray is used as a light source for example, the light source is not limited to the infrared ray.

Figure 4:
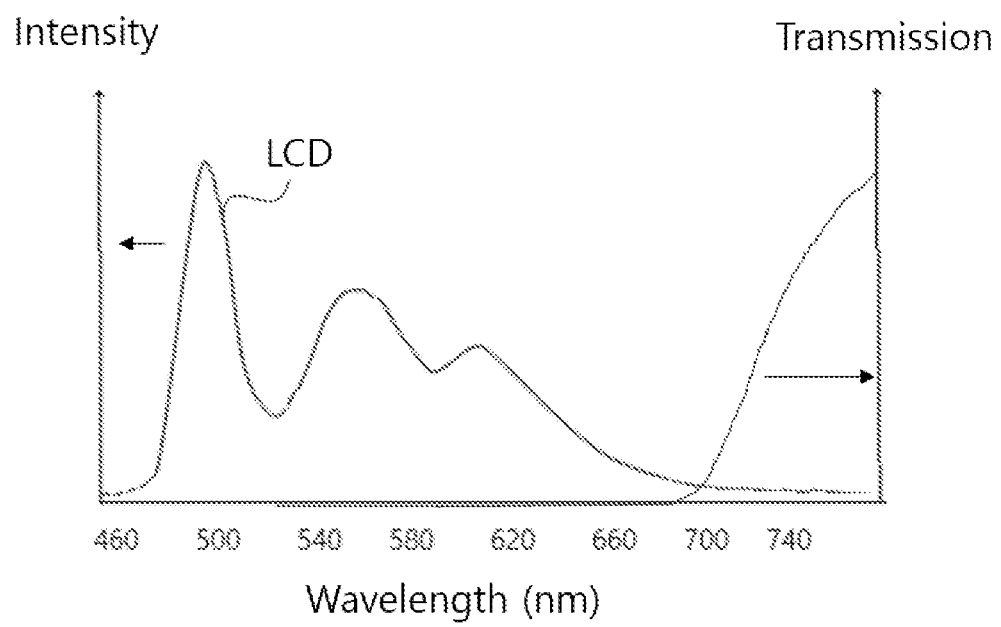
FIG. 4 is a graph showing the transmittance in the visible and ultraviolet regions by the beam splitter according to the present disclosure.

As shown in FIG. 4, when the beam splitter 35 of the present disclosure is used, it may reflect visible rays (R, G, B) having wavelengths of 460 nm to 740 nm emitted from the LCD panel but transmit infrared rays having wavelengths of 700 nm or more.

Here, the wavelength of the infrared ray may be used alone or in a mixture of near infrared rays of 740 nm to 2,500 nm, mid infrared rays of 2,500 nm to 50 μm, and far infrared rays of 50 μm to 1 mm.

Reflecting the light beam 36 in the visible ray area means to preferably reflect 80% or more of the light beam of the visible ray area 36, more preferably 90% or more, and most preferably 99% or more.

Transmitting the light beam 42 in the infrared ray area means to preferably transmit 80% or more of the light beam 42 of the infrared ray area, more preferably 90% or more, and most preferably 99% or more.

An optical device according to an embodiment of the present disclosure includes a display panel unit configured to emit image light; a lens array configured to be disposed on an optical path between the display panel unit and a screen on which an image is implemented to refract, diffract and reflect the incident image light thereby forming the image on the screen, or transfer the light reflected from the screen to the display panel unit through the optical path; and a beam splitter configured to be disposed on the optical path between the display panel unit and the screen on which the image is implemented. Here, the beam splitter may transmit the light beam of the display panel unit, and reflect the light beam sensing the image of the screen.

An example of the above-mentioned optical device 300 will be described with reference to FIG. 5. When the display panel unit 32 emits the light beam 37, the light beam 37 passes through the beam splitter 35 through the refraction part 33 having a plurality of lenses. Thereafter, if necessary, the light beam 37 is reflected by a reflector, or projects an image onto a table through a lens unit.

Figure 5:
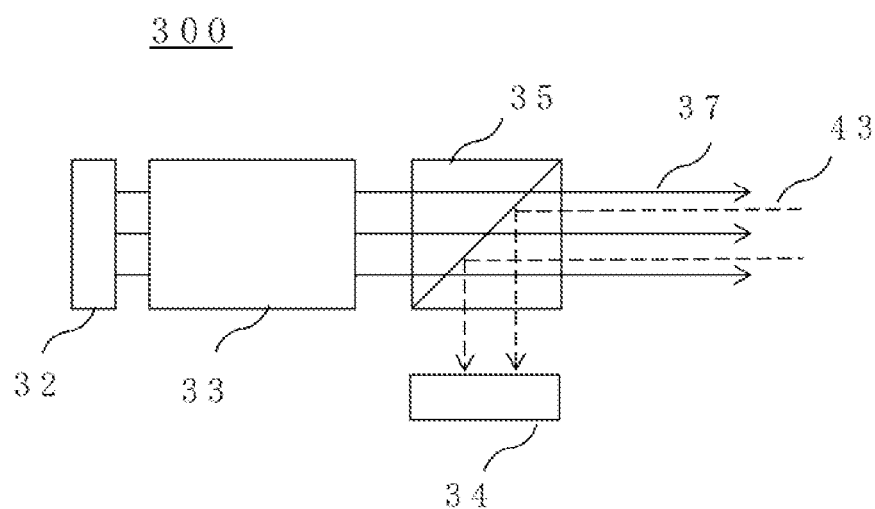
FIG. 5 shows an internal sectional view of the optical device according to the present disclosure.

In FIG. 5, while the refraction unit 33 having a plurality of lenses is located between the panel unit 32 and the beam splitter 35, the light beam transmitted from the panel unit may pass through the beam splitter to the refraction unit having a plurality of lenses.

The function of the sensor unit is as the above described. That is, a light beam is irradiated to a wider area than the projected image in order to give a touch function to the projected image and the difference of the amount of light between the touched and untouched portions on the projected image and its position are sensed by touching with a finger or the like.

Next, the beam splitter 35 transmits the light beam from the display panel unit and reflects the light beam sensing the image of the screen, which will be described with reference to FIG. 6. Hereinafter, an infrared light source will be described as an example, but is not limited thereto.

Figure 6:
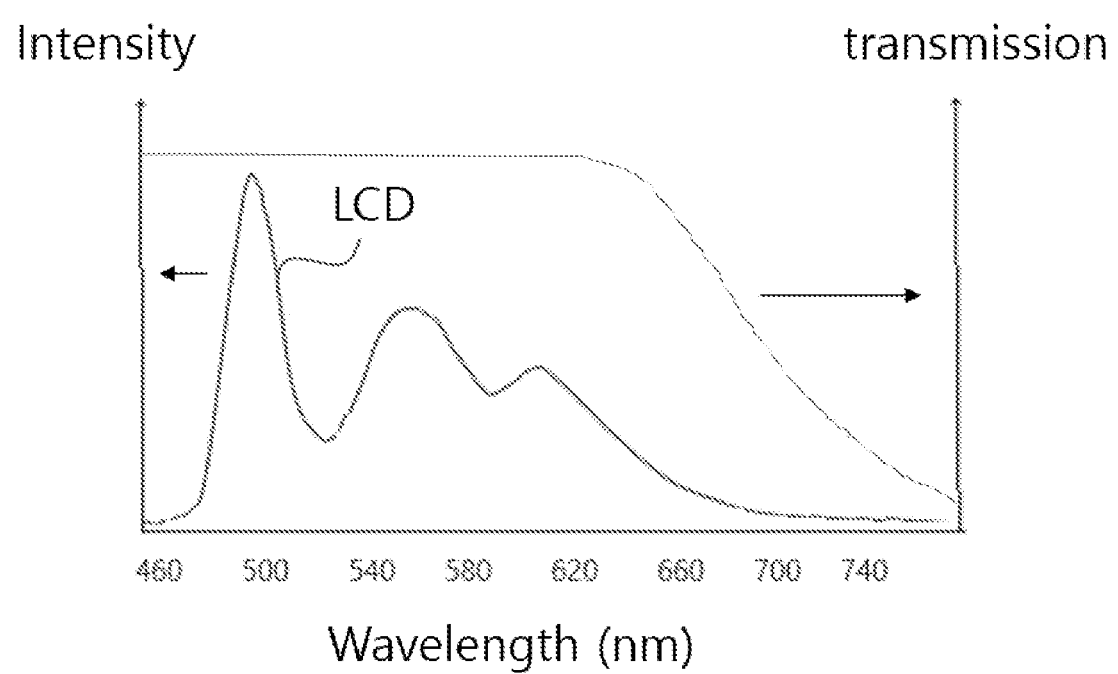
FIG. 6 is a graph showing the transmittance in the visible and ultraviolet regions by the beam splitter according to the present disclosure.

As shown in FIG. 6, when the beam splitter 35 of the present disclosure is used, the visible light beams(R, G, B) having wavelengths of 460 nm to 740 nm emitted from the LCD panel may be transmitted, but infrared rays having wavelengths of 740 nm or more may be reflected.

Here, the wavelength of the infrared ray may be used alone or in a mixture of near infrared rays of 740 nm to 2,500 nm, mid infrared rays of 2,500 nm to 50 μm, and far infrared rays of 50 μm to 1 mm.

Transmitting the light beam 37 in the visible ray region means to preferably transmit 80% or more of the visible ray 37, more preferably 90% or more, and most preferably 99% or more.

Reflecting the light beam 43 in the infrared ray region means to preferably reflect 80% or more of the light beam 43 in the infrared ray region, more preferably 90% or more, and most preferably 99% or more.

In one embodiment of the beam splitter of the present embodiment, the beam splitter may reflect the light beam of the display panel unit and transmit the light beam sensing the screen image. Otherwise, the beam splitter may transmit the light beam of the display panel unit and reflect the light beam sensing the screen image. In order to reflect the light beam in a specific wavelength region and transmit the light beam in another specific wavelength region, a multilayer film may be coated and used on the beam splitter, but is not limited thereto.

Meanwhile, the beam splitter may be used in any one of a cube shape, a triangle shape, and a plate shape. For example, in FIGS. 7A to 7C, various shapes of the beam splitter through which the light beam of the display panel unit is reflected and the light beam sensing the image of the screen is transmitted will be described.

Figure 7A:
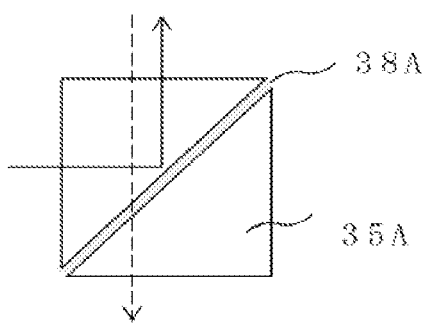
FIGS. 7A to 7C shows various shapes of the beam splitter of the present disclosure.
Figure 7B:
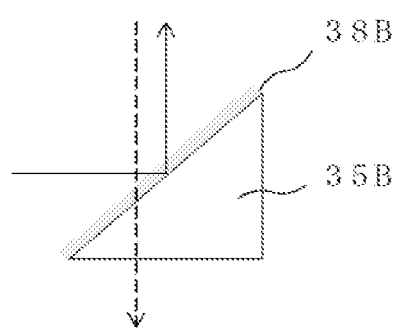
Figure 7C:
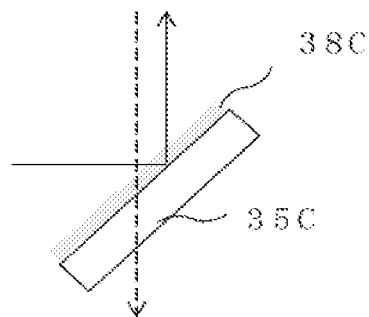

FIG. 7A shows a cube-shaped beam splitter, which has a coating layer 38A between two triangle plates 35A. FIG. 7B shows a triangle beam splitter, which has a coating layer 38B on one surface of the triangle plate 35B. FIG. 7C shows a plate-shaped beam splitter, which has a coating layer 38C on one surface of the plate-shaped plate 35C.

While FIGS. 7A to 7C illustrate the beam splitter that reflects the light beam of the display panel unit and transmits the light beam sensing the image of the screen, a beam splitter that transmits the light beam of the display panel unit and reflects the light beam sensing the image of the screen may have the same structure as described above.

The above description is merely illustrative of the technical idea of the present disclosure, and those skilled in the art may make various modifications and variations without departing from the essential quality of the present disclosure. Therefore, the embodiments of the present disclosure are not intended to limit the technical idea of the present disclosure, but to explain it, and the scope of the technical idea of the present disclosure is not limited to these embodiments. The scope of protection of the present disclosure should be interpreted by the claims below, and all technical ideas within the scope equivalent thereto should be interpreted as being included in the scope of the present disclosure.

DESCRIPTION OF DRAWING SYMBOLS

Projector: 20a, 20b
Optical device: 200, 300
Table: 10a, 10b
Optical emitting unit: 30a, 30b
Lamp: 40a, 40b
Display panel unit: 32
Refraction part: 33
Sensor unit: 34
Beam splitter: 35

What is claimed is:

1. An optical device, comprising:
   a display panel unit configured to emit image light;
   a lens array configured to be disposed on an optical path between the display panel unit and a screen on which an image is implemented to refract, diffract and reflect the image light thereby forming the image on the screen, or transfer the image light reflected from the screen to the display panel unit through the optical path; and
   a beam splitter configured to be disposed on the optical path between the display panel unit and the screen on which the image is implemented.

2. The optical device according to claim 1, further comprising a light source for irradiating a light beam to the screen.

3. The optical device according to claim 1, further comprising a sensor unit disposed on the optical path of the splitter to detect the image reflected from the screen.

4. The optical device according to claim 1, wherein
   the beam splitter reflects the image light from the display panel unit and transmits the image light to the screen, or
   wherein the beam splitter transmits the image light from the display panel unit and reflects the image light to the screen.

5. The optical device according to claim 1, wherein
   the beam splitter is located between the display panel and the lens array, or located between the lens array and the screen.

6. The optical device according to claim 1, wherein
   the beam splitter is one of a cube shape, a triangle shape and a plate shape.

7. The optical device according to claim 1, which is used in any one of an ultra short throw projector, a short throw projector, a beam projector, an optical scanning device, an augmented reality glasses and a head mounted device.

8. An optical device comprising an optical module that performs a combination of a projection function that implements an image by projecting a light beam from a microdisplay panel to a screen and a sensing function
   that senses external light by transferring the external light by a beam splitter disposed in the optical module to a condensing sensor.

* * * * *